United States Patent [19]

Reynolds

[11] 3,723,344

[45] Mar. 27, 1973

[54] OXO-SYNTHESIS GAS
[75] Inventor: Blake Reynolds, Riverside, Conn.
[73] Assignee: Texaco Development Corporation, New York, N.Y.
[22] Filed: Nov. 21, 1969
[21] Appl. No.: 878,725

[52] U.S. Cl..................................252/373, 23/260
[51] Int. Cl.................................................C07c 1/02
[58] Field of Search........................252/373; 23/213

[56] References Cited

UNITED STATES PATENTS 3,490,872   1/1970   Fenton...................................23/213
2,618,611   11/1952  Mayland................................252/373
2,465,235   3/1949   Kubicek................................252/373

Primary Examiner—Leon Zitver
Assistant Examiner—A. Siegel
Attorney—Thomas H. Whaley and Carl G. Ries

[57] ABSTRACT

Oxo-synthesis gas, i.e. a mixture of carbon monoxide and hydrogen containing substantially equal volumes of hydrogen and carbon monoxide is produced by direct partial oxidation of a hydrocarbon fuel with oxygen followed by noncatalytic reaction with carbon dioxide at a temperature of at least 1,500°F., and preferably in the range of about 1,700° to 2,800°F. in one or more reaction zones.

8 Claims, 1 Drawing Figure

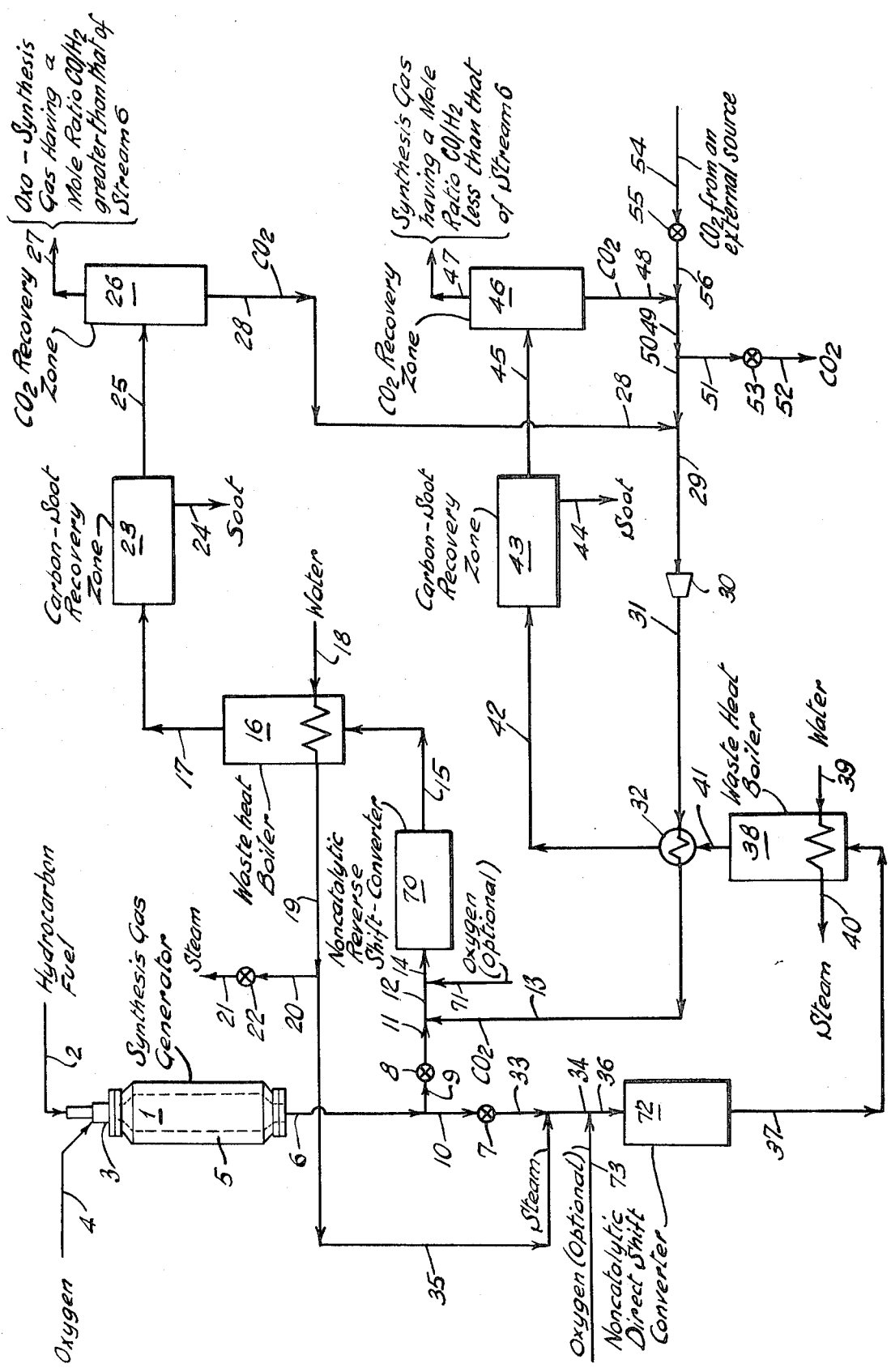

OXO-SYNTHESIS GAS

BACKGROUND OF THE INVENTION

1. Field of Invention

This invention relates to a method for the production of oxo-synthesis gas, i.e., a mixture of carbon monoxide and hydrogen useful in the synthesis of oxygen-containing organic compounds. In one specific embodiment of the invention two product streams of synthesis gas are produced simultaneously—one product stream having a mole ratio of $CO/H_2$ of about 1.0 or higher suitable as oxo-synthesis gas and the other product stream having a lower mole ratio of $CO/H_2$, e.g., about 0.5 to 1, suitable as methanol or Fischer-Tropsch synthesis gas.

2. Description of the Prior Art

Hydrogen and carbon monoxide for synthesis gas are commonly made by partial oxidation of hydrocarbon fuels with oxygen at autogenous reaction temperatures. Such mixtures are useful as a source of feed gas for the synthesis of ammonia, hydrocarbons, and oxygen-containing organic compounds.

The mole ratio of $CO/H_2$ in synthesis gas mixtures made by partial oxidation of a hydrocarbon with oxygen is primarily a function of the C/H ratio in the fuel. The introduction of steam, carbon dioxide or both as moderators in the reaction also has some effect on the $CO/H_2$ ratio of the synthesis gas so produced. Only limited amounts of such moderators may be supplied to the reaction zone of a synthesis gas generator without excessive reduction of the autogenous reaction temperature or production of unwanted by-products such as methane. Typically the product gas obtained by direct partial oxidation of liquid hydrocarbons contains approximately equal volumes of carbon monoxide and hydrogen. It is customary to increase the relative proportions of hydrogen to carbon monoxide by the catalytic water gas shift reaction.

The catalytic water-gas shift reaction by which carbon monoxide is reacted with steam over a catalyst at a temperature in the range of about 400° to 1,000°F., to produce hydrogen and carbon dioxide is well known. An iron-chrome oxide catalyst is commonly used at the higher temperatures while a zinc oxide-copper-oxide catalyst may be used at the lower temperatures.

SUMMARY

In an example of the present invention, oxo-synthesis gas having a mole ratio ($CO/H_2$) of about 1.0 is made by mixing $CO_2$-rich gas preferably at a temperature in the range of about 500° to 1,500°F. with hot effluent gas from a synthesis gas generation zone at a temperature in the range of 2,000° to 3,000°F. in a non-catalytic adiabatic water-gas reverse shift conversion zone at a temperature of at least 1,500°F., and preferably in the range of about 1700° to 2800°F., wherein a portion of the carbon dioxide in the water-gas shift feed gas mixture is reduced to carbon monoxide by a portion of the hydrogen in the water-gas shift feed gas mixture which is simultaneously oxidized to water. In a preferred embodiment of the invention, said effluent gas from a synthesis gas generator is fed to the noncatalytic shift converter at substantially the conditions of temperature and pressure produced by the partial oxidation of a hydrocarbon fuel in a free-flow synthesis gas generator. The pressure may be within the range of 1 to 350 atmospheres; pressures of 40 to 200 atmospheres are preferred.

It is therefore a principal object of the present invention to provide a novel, continuous, two stage process for the production of oxo-synthesis gas.

Another object of the invention is to simultaneously produce from a primary source of synthesis gas, two separate streams of synthesis gas—a first stream having a higher mole ratio ($CO/H_2$) and a second stream having a lower mole ratio ($CO/H_2$) than said primary source.

A still further object is to provide a noncatalytic process for making oxo-synthesis gas, which process may be independent of externally supplied heat.

These and other objects and advantages of the invention will be apparent from the following disclosure and from the drawing showing one embodiment of the invention.

DESCRIPTION OF THE INVENTION

Crude synthesis gas, principally comprising a mixture of carbon monoxide and hydrogen with minor amounts of $H_2O$, $CO_2$, and free carbon soot in the amount of about 0.01 to 3 weight percent (basis carbon in hydrocarbon fuel) is produced by the partial oxidation of a hydrocarbon fuel with free oxygen, and preferably relatively pure oxygen (95 mole percent $O_2$ or higher). The atomic ratio of free (uncombined) oxygen to carbon in the feed (O/C ratio) is in the preferable range of about 0.80 to 1.5. The reaction time in the gas generator is about 2 to 6 seconds.

Substantially any low cost hydrocarbon fuel may be used as feedstock for this process that produces by means of a partial oxidation synthesis gas generator a gas mixture comprising carbon monoxide and hydrogen in which the mole ratio $CO/H_2$ is less than that desired for the subsequent synthesis process. The effluent gas stream from the synthesis gas generator is preferably relatively rich in hydrogen. For example, charge stock to a synthesis gas generator may include gaseous, liquid or solid hydrocarbonaceous fuels. Suitable gaseous fuels include natural gas, refinery off-gas, acetylene tail gas, and by-product gas from the Fischer-Tropsch reaction.

Suitable liquid hydrocarbon fuels for feeding the synthesis gas generator cover the petroleum range from propane, naphthas and gas oils to certain fuel oils, reduced crude oils, and whole crude oils which are not high in C/H ratio.

The hydrocarbon fuel is partially oxidized in a refractory lined reaction zone of a free-flow synthesis gas generator at an autogenously maintained temperature within the range of about 2000° to 3000°F. and a pressure in the range of 1 to 350 atmospheres to produce a primary feedstream of synthesis gas. The synthesis gas generator preferably is a compact unpacked free-flow noncatalytic refractory-lined steel pressure vessel of the type described in U.S. Pat. No. 2,809,104 issued to D.M. Strasser et al. Preheating of the feedstream to the synthesis gas generator is optional, but generally desirable. For example, charging stocks of liquid hydrocarbon fuel and steam may be preheated to a temperature in the range of about 100° to 750°F. The introduction of steam into the synthesis gas generator is optional and is dependent upon the type of hydrocarbon fuel employed. For example, generally no steam is required with gaseous hydrocarbon fuels, whereas from about 0.1 to 1 part by weight of steam is used per part by weight of liquid hydrocarbon fuel.

The reaction zone for the noncatalytic water-gas reverse shift reaction may comprise an unpacked free-flow refractory lined steel pressure vessel lined with a refractory material and preferably free of obstructions and preferably of suitable size to provide a residence time in the range of about 0.1 to 5 seconds.

A stream of carbon dioxide-rich gas, preferably at a temperature in the range of about 500° to 1500°F. is mixed with hot effluent gas from said partial oxidation reaction zone and the mixture is introduced into a non-catalytic water-gas reverse shift converter. While such premixing is preferred, alternatively the $CO_2$-rich gas stream may be fed separately into the noncatalytic water-gas reverse shift converter and allowed to mix and react with the primary feedstream of synthesis gas separately introduced therein. Preferably, the amount of $CO_2$ in said $CO_2$-rich gas is in the range of about 25 to 95 mole percent, or more. Although only one shift converter is illustrated, optionally a plurality of separate reactors may be employed.

The amount of supplemental $CO_2$ added to said primary feed gas mixture must be sufficient to satisfy heat and material balances. The equilibrium constant ($K_R$) for the water gas reverse shift reaction as shown in Equation (I) below is a function of the reaction temperature and varies from 1.36 to 3.85 over a temperature range of 1700° to 2800°F.

$$K_R = [(CO) \times (H_2O)]/[(H_2) \times (CO_2)] \quad (I)$$

where: $(H_2)$, $(CO_2)$, $(CO)$ and $(H_2O)$ represent the mole fractions (or partial pressures) of the constituent enclosed by the parenthesis and $\times$ represents a multiplying factor.

The supplemental $CO_2$-rich gas stream may be a gas mixture comprising $CO_2$, $CO$, $H_2$ and $H_2O$, said gas mixture preferably having at least 25 mole percent of $CO_2$ and no significant amount of $CH_4$. In one specific embodiment of this invention, a stream of $CO_2$ containing at least 95 mole percent $CO_2$ is recovered as a by-product from the water-gas direct shift reaction between steam and hot synthesis gas, which simultaneously produces a stream of methanol synthesis feed gas having a mole ratio ($CO/H_2$) of about 5 or lower. Such a process is described in greater detail in my copending related application Ser. No. 878,728.

The water-gas shift feedstream is introduced into a noncatalytic free-flow adiabatic water-gas reverse shift converter having a residence time in the range of about 0.1 to 5 seconds at a temperature of at least 1500°F. and preferably for about 0.1 to 2 seconds at a temperature in the range of about 1700° to 2800°F. and at a pressure in the range of about 1 to 350 atmospheres.

In the noncatalytic water-gas reverse shift reaction, a portion of the carbon dioxide is reduced to carbon monoxide while simultaneously a stoichiometric amount of hydrogen is oxidized to water. The net result of the water-gas reverse shift reaction is to increase the mole ratio ($CO/H_2$) of the product gas leaving the water-gas reverse shift converter. Eliminating the catalyst is a decided economic advantage.

An elevated temperature is maintained in the water-gas shift reaction zone such that the adiabatic water-gas reverse shift reaction proceeds rapidly without a catalyst. The word "adiabatic" as used herein with respect to the water-gas shift reaction means that apart from minor unavoidable heat loss through the walls of the reactor, there is substantially no exchange of heat with the surroundings.

In a preferred embodiment of my invention, a primary feedstream of synthesis gas is introduced directly into said noncatalytic adiabatic water-gas reverse shift conversion zone at substantially the conditions of temperature and pressure produced in the reaction zone of an unpacked free-flow non-catalytic partial oxidation synthesis gas generator at a temperature in the range of about 2000° to 3800°F. and a pressure in the range of about 1 to 350 atmospheres, which satisfies the heat requirements for the next step in the process, i.e., the noncatalytic adiabatic water-gas reverse shift reaction. Thus the cost of heating and compressing gas is saved, providing a substantial economic advantage.

The gases leave the noncatalytic water-gas reverse shift converter at a temperature in excess of about 1500°F. and may be cooled in a cooling zone such as a waste heat boiler or direct water quench tank of conventional dip-leg quench design to a temperature in the range of about 400° to 800°F. The steam produced in the waste heat boiler may be used economically elsewhere in the process or may be exported. For a detailed description of cooling synthesis gas by means of a waste heat boiler and a scrubbing tower, reference is made to U.S. Pat. No. 2,980,523, issued to R. M. Dille et al. A suitable dip-leg gas-liquid contacting apparatus is shown in U.S. Pat. No. 2,896,927 issued to R. E. Nagle et al.

Entrained solid particles may be scrubbed from the cooled shifted effluent gas leaving the waste heat boiler by direct contact with quench water in a gas-liquid contact apparatus, for example, a quench tank, a spray tower, venturi or jet contacter, bubble plate or packed column, or a combination of said equipment. Conventional venturi or jet contactors are described in chemical Engineers' Handbook, Fourth Edition, ed. by J.H. Perry, N.Y., McGraw-Hill Co., 1963, pages 18–55 to 56.

Excessive carbon dioxide may be removed from the shifted gas stream by a suitable conventional regenerative scrubbing process, e.g., monoethanolamine, hot carbonate, or the Rectisol process. These processes may also remove any $H_2S$ which may be present in the product gas stream. The $CO_2$ may be recycled as a portion of the supplemental $CO_2$ introduced into the water-gas reverse shift converter.

Oxo-synthesis gas having a mole ratio ($CO/H_2$) of about 1.0 or higher may be made by the process of my invention, providing the effluent gas from the synthesis gas generator has a correspondingly lower $CO/H_2$ mole ratio than the desired product gas.

In another embodiment of my invention, a limited supplemental amount of free oxygen, preferably relatively pure oxygen (95 mole percent $O_2$ or higher) is introduced into the adiabatic noncatalytic water-gas reverse shift conversion zone in an amount sufficient to maintain the temperature therein at least 1500°F. and preferably in the range of 1700° to 2800°F.

In still another embodiment of my invention, a separate portion of the primary feedstream of synthesis gas may be reacted with steam in a one or more non-catalytic adiabatic water-gas direct shift converters. A separate product gas stream of synthesis gas is thereby made having a mole ratio ($CO/H_2$) which is less than that of the primary feed gas mixture. For example, a product gas stream may be produced having a mole ratio ($CO/H_2$) of preferably about 0.5 for use as methanol synthesis gas. Further, portions of the streams of oxo-synthesis gas and methanol synthesis gas may be blended to produce a synthesis gas stream of intermediate composition. The operating conditions in the direct shift converter are temperature in excess of about 1500°F. and preferably about 1700° to 2800°F. and pressure in the range of about 1 to 350 atmospheres. However, the same conditions of temperature and pressure existing in the partial oxidation free flow noncatalytic synthesis gas generator used to make the primary feedstream of synthesis gas, less any minor unavoidable temperature reduction in the piping and equipment, are preferred. The adiabatic water-gas direct shift reaction proceeds rapidly without a catalyst. The shift effluent gas leaves said non-catalytic water-gas direct shift converter at a temperature in the range of about 1700° to 2800°F. Entrained free-carbon soot and $CO_2$ may be recovered from the shifted effluent gas from the direct shift converter in the manner described previously for the preparation of oxo-synthesis gas. The recovered $CO_2$-rich stream may be recycled to the water-gas reverse shift converter.

In still another embodiment of my invention, the water-gas shift feedstream is subjected to a plurality of and preferably two successive steps of water-gas reverse shift reaction. The first water-gas reverse shift reaction is performed in a noncatalytic adiabatic water-gas reverse shift reactor, and the shifted gas is then subjected to further shifting in a second noncatalytic water-gas reverse shift reactor, in the manner previously described for the first shift reaction.

Supplemental $CO_2$-rich stream is introduced into the first shift reactor, and also if desired into the second shift reactor along with the shift feedstream. Supplemental free-oxygen, preferably pure oxygen (95 mole percent $O_2$ or higher) may be introduced into the first or second shift reactor, or both. Multi-shift operation is recommended for specific instances where a product gas with a desired composition cannot be easily made by the single direct or reverse shift process. If the temperature of the water-gas shift feed gas is too low for the first or second shift reaction, or both, a limited supplemental amount of free oxygen, preferably pure oxygen (95 mole percent $O_2$ or higher) may be introduced in admixture with said supplemental $CO_2$. In such case, a portion of the $H_2$ and CO in the shift feed gas mixture reacts with said supplemental free oxygen so as to raise the temperature in the reaction zone to at least 1500°F. and preferably to a temperature in the range of 1700° to 2800°F.

DESCRIPTION OF THE DRAWING AND EXAMPLES

A more complete understanding of the invention may be had by reference to the accompanying schematic drawing which illustrates the process of this invention.

The following description of the drawing also serves as a specific example of the invention. Although the drawing and example illustrate a specific preferred embodiment of the process of this invention, it is not intended to limit the invention to the particular apparatus or materials described.

The drawing illustrates a specific example wherein both oxo-synthesis gas and methanol synthesis gas is produced from separate portions of an effluent stream of synthesis gas from a free-flow noncatalytic synthesis gas generator. The oxo-synthesis gas has a higher mole ratio $CO/H_2$ than said effluent stream of synthesis gas, while the mole ratio $CO/H_2$ of the methanol synthesis gas is comparatively lower than said effluent stream of synthesis gas.

EXAMPLE I

This example illustrates a preferred embodiment of the process of my invention as applied to the manufacture of oxo-synthesis and methanol synthesis gas from a petroleum refinery off-gas.

With reference to the drawing, 159.6 moles per hour of Refinery Gas at a temperature of 1000°F and a pressure of 550 pounds per square inch gauge (psig) and having the following composition are introduced into Synthesis Gas Generator 1 by way of line 2 and burner 3:

| | |
|---|---|
| Hydrogen | 18 mole percent |
| Methane | 60 mole percent |
| Ethylene | 2 mole percent |
| Ethane | 19 mole percent |
| Propane | 1 mole percent |

105.6 moles per hour of pure oxygen in a stream of 95 mole percent purity at a temperature of 300°F and a pressure of 550 psig are introduced into gas generator 1 by way of line 4 and are reacted with said Refinery Gas in refractory lined 5 reaction zone of Generator 1 to produce a primary feedstream of synthesis gas. 491.9 moles per hour of the primary feedstream of synthesis gas at a temperature of 2600°F, and a pressure of 500 psig and having a mole ratio ($CO/H_2$) of 0.56 leave gas generator 1 by way of line 6. Also entrained in the effluent gas in line 6 is about 0.05 weight percent of free carbon soot (basis carbon in the refinery gas feed).

By means of control valves 7 and 8, the effluent stream of synthesis gas in line 6 is divided between lines 9 and 10 in the ratio of 1 to 3. 123.0 moles per hour of effluent gas at 2600°F, in line 9 is passed through valve 8, line 11, and into line 12 where it is mixed with 25.7 moles per hour of a gas stream comprising 100 percent of carbon dioxide at a temperature of 1000°F. from line 13. The gas mixture comprising about 0.21 volumes of $CO_2$ from line 13 per volume of synthesis gas comprising substantially $H_2$ and CO from line 11 is introduced through line 14 into noncatalytic water-gas reverse shift converter 70 at a pressure of 500 psig. There, by the endothermic reaction between $CO_2$ and $H_2$, CO and $H_2O$ are produced. An anlysis of the mixed gases leaving the noncatalytic reverse shift converter 70 in line 15 at a temperature of about 2035°F is shown in Table 1.

Although not required for this example, optionally, free-oxygen (95 mole percent $O_2$ or higher) in line 71 may be introduced into reverse shift-converter 70 in an amount sufficient to maintain the temperature therein at least 1500°F., and preferably about 1700° to 2800°F.

148.7 moles per hour of gases in line 15 are cooled to a temperature of 575°F. by means of waste-heat boiler 16 and leave by way of line 17. 133.0 moles per hour of boiler-feed water at 485°F. in line 18 are converted to 600 psig saturated steam in waste heat boiler 16 and leave by way of line 19. About 113.2 moles per hour of excess steam are removed from the system for export by way of lines 20 and 21 and valve 22. All but about 2 parts per million of free carbon soot in the gases by weight of dry gas in line 17 is removed in a conventional carbon-soot recovery zone 23 and may be discharged from the system through line 24 as a slurry of free carbon soot and water. Any suitable carbon recovery system may be used, for example, scrubbing the gas in line 17 with water by means of a commercially available venturi scrubber.

The soot-free gas in line 25 is introduced into a conventional carbon dioxide recovery zone 26, as previously described. 112.0 moles per hour of oxo-synthesis product gas are removed by way of line 27 having a $CO/H_2$ ratio of 1.00 which is substantially greater than the 0.57 mole ratio of $CO/H_2$ in line 6. A gas analysis of stream 27 is shown in Table I. 12.3 moles per hour of 100 percent $CO_2$ are recovered and recycled to shift-converter 70 by way of lines 28 and 29, compressor 30, line 31, heat exchanger 32, and lines 13, 12 and 14. The pressure of the $CO_2$ stream in line 13 is increased to exceed the pressure of the primary feedstream of synthesis gas in line 11 by means of compressor 30.

About 368.9 moles per hour of the primary feedstream of synthesis gas in line 10 at a temperature of 2600°F. are passed through line 33 and are mixed in line 34 with 19.8 moles per hour of steam from line 35 at a temperature of 1000°F. The mixture of steam and synthesis gas in line 34, comprising substantially $H_2$ and CO is passed through line 36 into noncatalytic water-gas direct shift converter 72 where they react at a pressure of about 500 psig. The shifted effluent stream of synthesis gas leaves shift converter 72 by way of line 37 at a temperature of 2465°F. and is cooled to a temperature of 575°F. in waste heat boiler 38, by indirect heat exchange with water entering through line 39 and leaving as steam through line 40. The excess steam in line 40 is exported from the system. The shift effluent gases leave waste heat boiler 38 by way of line 41 and are cooled still further in heat exchanger 32 by indirect heat exchange with the $CO_2$ stream from line 31, as previously described.

Although not required in this example, optionally, free-oxygen (95 mole percent or higher) in line 73 may be introduced into direct shift converter 72 in an amount sufficient to maintain the temperature therein at least 1500°F.

The cooled shifted effluent gas stream in line 42 is introduced into a conventional carbon-soot recovery zone 43, which is similar to the carbon-soot recovery zone 23, as previously described. All but about 2 parts per million of carbon soot by weight of dry gas is recovered from the shifted effluent gas stream and is removed from the system by way of line 44. The soot-free shifted effluent gas in line 45 is introduced into a $CO_2$ recovery zone 46, which is similar to $CO_2$ recovery zone 26 as previously described. About 360.0 moles per hour of shifted synthesis gas having a $CO/H_2$ mole ratio of 0.50 which is less than the mole ratio ($CO/H_2$) of the effluent stream of synthesis gas in line 6 is removed by way of line 47 from $CO_2$ recovery zone 46. An anlysis of this gas is shown in Table I. A stream of 14.5 moles per hour of supplementary $CO_2$ is removed from $CO_2$ recovery zone 46 by way of lines 48 and 49.

About 13.4 moles per hour of $CO_2$ from line 50 is mixed in line 29 with a stream of 12.3 moles per hour of $CO_2$ from line 28. About 1.1 moles/hr. of excess $CO_2$ is removed from the system by way of lines 51, 52 and valve 53. The combined $CO_2$ streams totaling 25.7 moles per hour of supplemental $CO_2$ are heated in heat exchanger 32 and then directed into noncatalytic water-gas reverse shift converter 14 by way of lines 13 and 12 as previously described.

TABLE I

GAS ANALYSIS

| Component Mole % | Stream Number | | | | | | | | |
|---|---|---|---|---|---|---|---|---|---|
| | 6 | 13 | 15 | 28 | 27 | 35 | 37 | 48 | 47 |
| CO | 32.4 | | 36.9 | | 49.0 | | 28.2 | | 32.7 |
| $H_2$ | 56.9 | | 36.9 | | 49.0 | | 56.5 | | 65.3 |
| $CO_2$ | 1.3 | 100 | 8.2 | 100 | | | 3.7 | 100 | |
| $H_2O$ | 7.9 | | 16.7 | | 0.33 | 100 | 10.1 | | 0.34 |
| $CH_4$ | 0.38 | | 0.36 | | 0.42 | | 0.35 | | 0.41 |
| A | 0.78 | | 0.65 | | 0.87 | | 0.72 | | 0.87 |
| $N_2$ | 0.34 | | 0.29 | | 0.38 | | 0.33 | | 0.38 |
| | 100.00 | 100 | 100.00 | 100 | 100.00 | 100 | 100.00 | 100 | 100.00 |
| $CO/H_2$ | 0.57 | | 1.00 | | 1.00 | | 0.50 | | 0.50 |
| Moles/hr. | 491.9 | 25.7 | 148.7 | 12.3 | 112.0 | 19.8 | 388.8 | 14.5 | 33.60 |

Although the specific drawing and specific example above illustrate and describe an operation in which two specific product gases are obtained, namely oxo-synthesis feed-gas and feed gas for methanol synthesis, in many instances it is desirable to produce only an oxo-synthesis feed gas. This preferred operation is illustrated in Example II.

EXAMPLE II

With reference to the drawing, 491.9 moles per hour of effluent gas leave the reaction zone of unpacked free flow noncatalytic synthesis generator 1 by way of line 6 as described in Example I. With valve 7 closed and valve 8 open, all of this effluent gas stream is passed through lines 6, 9 and 11 and is mixed in line 12 with 53.8 moles per hour of a stream of 100 percent pure carbon dioxide from an external source which is introduced into the system by way of line 54, valve 55, and lines 56, 49 and 50 and mixed in line 29 with 49.1 moles per hour of a recycle stream of $CO_2$ from $CO_2$ recovery zone 26 by way of lines 28 and 39. By means of compressor 30, the mixed stream of supplemental $CO_2$ in line 29 is passed through line 31 and into heat exchanger 32 where the temperature is increased to 1000°F. and from there the supplemental $CO_2$ stream is passed into lines 13, 12, and 14.

Water-gas reverse shift reaction takes place in noncatalytic reverse shift converter 70 at a temperature of about 2035° F. and a pressure of about 500 psig. Four hundred and forty-eight moles per hour of oxo-synthesis gas leave $CO_2$ recovery zone 26 by way of line 27 having the chemical analysis as shown in Table II.

TABLE II

Gas Analysis

| Component Mole % | Stream Number | | | | |
|---|---|---|---|---|---|
| | 6 | 13 | 15 | 28 | 27 |
| CO | 32.4 | | 36.9 | | 49.0 |
| $H_2$ | 56.9 | | 36.9 | | 49.0 |
| $CO_2$ | 1.3 | 100 | 8.2 | 100 | |
| $H_2O$ | 7.9 | | 16.7 | | 0.33 |

|        | 1     |       | 2      |      | 3      |
| ------ | ----- | ----- | ------ | ---- | ------ |
| CH$_4$ | 0.38  |       | 0.36   |      | 0.42   |
| A      | .78   |       | 0.65   |      | 0.87   |
| N$_2$  | 0.34  |       | 0.29   |      | 0.38   |
|        | 100.00| 100   | 100.00 | 100  | 100.00 |
| CO/H$_2$ | 0.57 |      | 1.00   |      | 1.00   |
| Moles/Hr. | 491.9 | 102.9 | 594.8 | 49.1 | 545.7 |

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

I claim:

1. In a process for the production of synthesis gas comprising a mixture of carbon monoxide and hydrogen which comprises forming a mixture of carbon monoxide and hydrogen relatively rich in hydrogen by subjecting a hydrocarbon fuel to partial oxidation with free oxygen containing gas and optionally with a temperature moderator selected from the group consisting of H$_2$O, CO$_2$ and mixtures thereof in a gas generating zone producing a stream of effluent gas having a temperature in the range of about 2000° to 3000°F., and a pressure in the range of from 1 to 350 atmospheres the improvement which comprises introducing said effluent gas at substantially the same conditions of temperature and pressure produced in said gas generating zone and a stream comprising supplemental carbon dioxide directly into a separate unpacked free-flow noncatalytic adiabatic water-gas reverse shift conversion zone wherein said CO$_2$ is reacted with H$_2$ at a temperature of at least 1500°F producing a synthesis gas product stream containing CO, H$_2$, H$_2$O and CO$_2$ and having a mole ratio (CO/H$_2$) greater than the mole ratio (CO/H$_2$) of said effluent gas from said gas generating zone.

2. The process of claim 1 wherein the mole ratio (CO/H$_2$) of the synthesis gas product stream is substantially that required for the synthesis of oxo compounds.

3. The process of claim 1 wherein the mole ratio (CO/H$_2$) of the synthesis gas product stream leaving the non-catalytic water-gas reverse shift conversion zone is substantially that required for the Fischer-Tropsch process.

4. The process of claim 1 with the added step of introducing supplemental free-oxygen (95 moles percent O$_2$ or higher) into said noncatalytic adiabatic water-gas reverse shift conversion zone in an amount sufficient to maintain the reaction temperature in said reverse shift conversion zone at a temperature in the range of 1700° to 2800°F.

5. The process of claim 1 with the added steps of removing substantially all of the CO$_2$ which may be present in said synthesis gas product stream by processing said product gas stream in a conventional carbon dioxide recovery zone to produce a gas stream comprising at least 95 mole percent CO$_2$, and recycling said CO$_2$ stream to said non-catalytic adiabatic water-gas reverse shift conversion zone as at least a portion of said supplemental CO$_2$ stream.

6. The process of claim 1 wherein at least a portion of said stream of supplemental carbon dioxide is supplied as a gaseous feedstream from an external source comprising at least 25 mole percent of CO$_2$.

7. The process of claim 1 with the added steps of introducing a stream of supplemental carbon dioxide and said synthesis gas product stream directly into a second separate unpacked free-flow adiabatic noncatalytic water-gas reverse shift conversion zone wherein said CO$_2$ is reacted with H$_2$ at a temperature of at least 1500°F and at a pressure in the range of about 1 to 350 atmospheres, producing a synthesis gas product stream containing CO, H$_2$, H$_2$O, and CO$_2$ and having a mole ratio (CO/H$_2$) greater than the mole ratio (CO/H$_2$) of the synthesis gas product stream from the first noncatalytic adiabatic water-gas reverse shift conversion zone.

8. The process of claim 7 with the added step of introducing supplemental free-oxygen (95 mole percent O$_2$ or higher) into said second adiabatic noncatalytic water-gas reverse shift conversion zone in an amount sufficient to maintain the reaction temperature in said second noncatalytic water-gas reverse shift conversion zone at a temperature in the range of about 1700° to 2800°F.

* * * * *